US006825256B2

(12) United States Patent
Bae et al.

(10) Patent No.: US 6,825,256 B2
(45) Date of Patent: Nov. 30, 2004

(54) STABILITY IMPROVEMENT OF CARBON MONOXIDE ETHYLENE COPOLYMER IN PVC COMPOUND

(75) Inventors: Kook Jin Bae, Kinnelon, NJ (US); Stuart D. Brilliant, Levittown, NY (US); Johannes Kaufhold, Closter, NJ (US)

(73) Assignee: Crompton Corporation, Middlebury, CT (US)

( * ) Notice: Subject to any disclaimer, the term of this patent is extended or adjusted under 35 U.S.C. 154(b) by 360 days.

(21) Appl. No.: 10/043,252

(22) Filed: Jan. 14, 2002

(65) Prior Publication Data

US 2003/0166753 A1 Sep. 4, 2003

(51) Int. Cl.[7] ............................................. C08J 5/092
(52) U.S. Cl. ........................ 524/297; 524/114; 524/298; 524/398; 524/399; 524/400; 524/401; 524/502
(58) Field of Search ........................ 523/427; 524/297, 524/298, 398, 399, 400, 401, 523, 114, 502

(56) References Cited

U.S. PATENT DOCUMENTS

| | | | | | |
|---|---|---|---|---|---|
| 3,780,140 | A | * | 12/1973 | Hammer | 525/185 |
| 4,489,193 | A | * | 12/1984 | Goswami | 525/190 |
| 4,957,954 | A | | 9/1990 | Lizuka et al. | |
| 4,983,665 | A | * | 1/1991 | Backderf | 524/533 |
| 5,004,776 | A | | 4/1991 | Tadenuma et al. | |
| 5,025,051 | A | | 6/1991 | Sato et al. | |
| 5,034,443 | A | | 7/1991 | Bae et al. | 524/180 |
| 5,190,700 | A | | 3/1993 | Watanabe et al. | |
| 5,380,786 | A | * | 1/1995 | Greenlee et al. | 524/560 |
| 5,519,077 | A | | 5/1996 | Drewes et al. | |
| 5,543,449 | A | | 8/1996 | Drewes et al. | |
| 5,575,951 | A | | 11/1996 | Anderson | |
| 5,925,696 | A | | 7/1999 | Wehner et al. | |
| 5,969,015 | A | * | 10/1999 | Zinke et al. | 524/109 |
| 6,194,494 | B1 | | 2/2001 | Wehner et al. | |

FOREIGN PATENT DOCUMENTS

| | | |
|---|---|---|
| CA | 2096490 | 11/1993 |
| CA | 2137868 | 6/1995 |
| CA | 2179367 | 12/1996 |
| CA | 2179954 | 12/1996 |
| EP | 246867 A2 | 5/1987 |
| JP | 59129784 | 1/1986 |
| JP | 10228487 | 1/2000 |
| WO | WO 9220742 | 11/1992 |
| WO | WO93/02133 | 2/1993 |
| WO | WO94/24200 | 10/1994 |

OTHER PUBLICATIONS

Farago et al., "Complexes of Nickel(11) with Ethylenediamine and Perchorlate or Tetraphenylborate" appearing in Journal of Chem. Soc. (A) at pp. 820–824 (1967).

Lewis et al. "The Crystal and Molecular Structure of Di–u–hydroxo–bis[2–(2–ethylaminoethyl)pyridine]dicopper(II)Perchlorate", appearing in Inorganic Chemistry, vol. 11, No. 9 at pp. 2216–2221 (1972).

Voegele et al., "Complexes de Cations Alcalins et Alcalino–Terreaux avec des Ligands Tripodes. II Structure Cristalline du Complexe Triethanolamine–Iodure de Sodium" Acta Cryst. (1974) B30, 62 (1974).

Donatti et al., "Improved Instrument Panel Heat Age Staining Properties–PVC Slush Powder Vinyl", 35th Annual Polyurethane Technical/Marketing Conference, Oct. 9–12, (1994) at pp. 665–668.

Naiini et al. "Alkali and Alkaline Earth Metal Chloride Complexes of Triethanolamine: the Structure of $[Sr(TEA)_2]$ $Cl_2$·at pp. 2087–2092. (Polyhedron) vol. 16, No. 12, (1997).

Ahmed A. Naiini et al. "Triethanolamine Complexes of H+, Li+, $Na^2$+, and $Ba^2$+ Perchlorates" appearing in Inorganic Chemistry, vol. 33, No. (1994) pp 2137–2141.

Ahman A. Naiini et al. New Complexes of Triethanolamine (TEA): Novel Structural Features of $[Y(TEA)_2](CIO_4)$ $_3 3C_5H_5N$ and $[Cd(TEA)_2](NO_3)_{2i}$ pp 393400; (1995) Elsevier Science Ltd., Polyhedron vol. 14, No. 3.

Japanese Abstract: JP 1065158 A.
Japanese Abstract: JP 59140261 A.
Japanese Abstract: JP 60203657 A.
Japanese Abstract: JP 60219246 A.
Japanese Abstract: JP 60219247 A.
Japanese Abstract: JP 60223844 A.
Japanese Abstract: JP 61009451 A.
Japanese Abstract: JP 61034042 A.
Japanese Abstract: JP 61078874 A.
Japanese Abstract: JP 61083245 A.
Japanese Abstract: JP 61113630 A.
Japanese Abstract: JP 61115089 A.
Japanese Abstract: JP 61231041 A.
Japanese Abstract: JP 61231041 A.
Japanese Abstract: JP 61272258 A.
Japanese Abstract: JP 61253331 A.
Japanese Abstract: JP 62277455 A.
Japanese Abstract: JP 63118374 A.
Japanese Abstract: JP 1256553 A.
Japanese Abstract: JP 1294757 A.
Japanese Abstract: JP 01299856.
Japanese Abstract: JP 2142843 A.
Japanese Abstract: JP 2175741 A.

(List continued on next page.)

Primary Examiner—Judy M. Reddick
(74) Attorney, Agent, or Firm—Michael P. Dilworth

(57) ABSTRACT

A carbon monoxide modified ethylene-vinyl acetate copolymer composition is disclosed, having diminished tendency to cause discoloration on heating at 177° C. of a plastic composition whose major polymeric component is polyvinyl chloride, comprising carbon monoxide modified ethylene-vinyl acetate copolymer and an amount, effective in diminishing discoloration, of at least one inorganic perchlorate salt selected from the group consisting of alkali metal perchlorates and alkaline earth metal perchlorates.

17 Claims, No Drawings

OTHER PUBLICATIONS

Japanese Abstract: JP 2182741 A.
Japanese Abstract: JP 2245038 A.
Japanese Abstract: JP 04021659.
Japanese Abstract: JP 04033940.
Japanese Abstract: JP 04173854.
Japanese Abstract: JP 04359948.
Japanese Abstract: JP 05025318.
Japanese Abstract: JP 05039397.
Japanese Abstract: JP 05078499.
Japanese Abstract: JP 05125241.
Japanese Abstract: JP 05287144.
Japanese Abstract: JP 05320547.
Japanese Abstract: JP 06297624.
Japanese Abstract: JP 06340788.
Japanese Abstract: JP 07062181.
Japanese Abstract: JP 07149979.
Japanese Abstract: JP 07149980.
Japanese Abstract: JP 07149983.
Japanese Abstract: JP 07149984.
Japanese Abstract: JP 07173353.
Japanese Abstract: JP 07278388.
Japanese Abstract: JP 8027337 A.
Japanese Abstract: JP 08283499.
Japanese Abstract: JP 08333495.
Japanese Abstract: JP 08333496.
Japanese Abstract: JP 8283499 A.
Japanese Abstract: JP 9048896 A.
Japanese Abstract: JP 09137019.
Japanese Abstract: JP 09165463.
Japanese Abstract: JP 09174721.
Japanese Abstract: JP 09208777.
Japanese Abstract: JP 09278963.
Japanese Abstract: JP 09302180.
Japanese Abstract: JP 10158451.
Japanese Abstract: JP 10219057.
Japanese Abstract: JP 11020101.
Japanese Abstract: JP 11116752.
Japanese Abstract: JP 11152384.
Japanese Abstract: JP 10219057.
Japanese Abstract: JP 11209544.
Japanese Abstract: JP 11302486.
Japanese Abstract: JP 11320772.
Japanese Abstract: JP 62079249.
Japanese Abstract: JP 62252445.
Japanese Abstract: JP01079245.
Japanese Abstract: JP 01236252.
Japanese Abstract: JP 01252649.
Japanese Abstract: JP 03103451.
Japanese Abstract: JP 04183735.
Japanese Abstract: JP 04359949.
Japanese Abstract: JP 06145448.
Japanese Abstract: JP 06271731.
EP Abstract: EP 750013 A.

* cited by examiner

STABILITY IMPROVEMENT OF CARBON MONOXIDE ETHYLENE COPOLYMER IN PVC COMPOUND

FIELD OF THE INVENTION

This invention relates to a carbon monoxide modified ethylene copolymer with an unsaturated ester softening monomer, particularly an ethylene-vinyl acetate copolymer (EVA) and more particularly to carbon monoxide modified ethylene-vinyl acetate polymer having a diminished tendency to cause discoloration when compounded with a plastic composition at an elevated temperature, typically 180 C. In particular, the invention relates to carbon monoxide modified ethylene-vinyl acetate copolymer and similar copolymers of carbon monoxide with ethylene and an unsaturated ester softening monomer in a plastic composition in which the major polymeric component is a vinyl chloride polymer such as polyvinyl chloride, conveniently abbreviated pvc.

For a review of the utilization of ethylene-vinyl acetate copolymer as an additive and compounding ingredient in plastic compositions, reference can be made to Chapter 7 by Jesse Edenbaum in "Handbook of Plastics Additives and Modifiers", J. Edenbaum, ed., (New York: Van Nostrand Reinhold 1992), pages 95–101. It is there stated that while homopolymer polyethylene is incompatible with pvc, EVA is increasingly compatible with pvc with increasing vinyl acetate content, but the polymers with a higher vinyl acetate content are tackier and softer. A more favorable balance of properties is achieved in the carbon monoxide modified ethylene-vinyl acetate copolymers, and some of these have become established as specialty plasticizers for pvc. These are described as permanent plasticizers for pvc. They reduce pvc glass temperature and stiffness, and increase its toughness. For film, a preferred composition is stated to consist of 30–65% pvc and 35–70% of a copolymer containing 40–80% ethylene, 10–60% vinyl acetate, and 3–30% carbon monoxide. Other unsaturated ester softening monomers, such as vinyl esters of saturated carboxylic acids having 1–18 carbon atoms and alkyl acrylates and methacrylates having 1 to 10 carbon atoms in the alkyl group, can be substituted for vinyl acetate in these copolymers (see for example C. F. Hammer, U.S. Pat. No. 3,780,140.)

The above review also notes the need to use antioxidants, particularly sterically hindered phenolic types, in such high temperature processes as injection molding and cable jacket extrusion of EVA polymers. For extra-high stabilization, the addition of secondary protective agents such as phosphites or the thioethers is recommended. For some elevated temperature applications, the further addition of an acid scavenger is advised.

The problem of imparting to pvc a sufficient heat processing stability at temperatures at which the polymer becomes sufficiently fluid or softened to permit shaping is of long standing. It has been resolved in principle by the addition to the polymer of various combinations of known heat stabilizers. Given the great versatility of plastic compositions in which pvc is the major polymeric component, however, the selection of the right stabilizer or stabilizer combination for any given composition remains an empirical art in which theories and predictions are of limited usefulness.

There exists a prodigiously large literature relating to stabilizers for pvc. For a convenient review and classification reference can be made to Chapters 16–20 in the above-cited "Handbook", pages 208–337.

The following individual disclosures are believed to represent the closest prior art to the present invention.

J. Kaufhold et al., Canada published patent application 2,096,490 disclosed a stabilized vinyl chloride homopolymer composition comprising (a) 20–80% by weight of vinyl chloride homopolymer, (b) 80–20% by weight of at least one copolymer from the group consisting of ABS, NBR, NAR, SAN and EVA (c) 0.5–5% by (based on (a) and (b)) of at least one organotin compound having one of five specified formulae and (d) 0.01–1.0% by weight (based on (a) and (b)) of at least one perchlorate of a monovalent and/or divalent metal. The composition may advantageously contain further conventional pvc stabilizers and/or further additives, for example, epoxy compounds, phosphites, metal carboxylates and metal phenolates of metals from the second main group or subgroup of the Periodic Table.

O. Takashi et al, Japan published patent application 12-026687 disclosed a polyvinyl chloride resin composition stabilized with a combination of a perchloric acid treated hydrotalcite (i.e. a hydrated magnesium aluminum hydroxide-carbonate in which some or all of the carbonate is displaced by perchlorate) and a trimethylolalkane type of polyhydric alcohol, and not containing heavy metal compounds such as zinc compounds, cadmium compounds, barium compounds, lead compounds and tin compounds. Polyvinyl chloride is disclosed to refer to vinyl chloride homopolymer, the copolymer which makes vinyl chloride a principal component, chlorinated polyethylene, polyvinylidene chloride, chlorinated polypropylene, and blends including polymer which does not contain vinyl chloride, such as an ethylene-vinyl acetate copolymer, an ethylene-vinyl acetate-1 carbon monoxide copolymer, an acrylic ester polymer, a methacrylic ester-butadiene-styrene graft polymer, or a special polyurethane resin.

K. Bae et al., U.S. Pat. No. 5,034,443 disclosed that a blend of sodium perchlorate hydrate and calcium silicate provides improved long term heat stability to a polyvinyl chloride resin containing a conventional heat stabilizer, and that a combination of a solution of sodium perchlorate in water with calcium silicate and a non-absorbing diluent powder such as calcium carbonate provides a free-flowing powder composition of reduced hazard level. Other non-absorbing diluent powders include zeolites, silica, alumina, PVC resins, barium sulfate, and the like.

R. Drewes et al U.S. Pat. Nos. 5,519,077 and 5,543,449 disclosed compositions comprising (a) pvc, (b) perchloric acid or a perchlorate, (c) a terminal epoxide compound and (d) an antioxidant ('077) and (a) flexible pvc, (b) perchloric acid or a perchlorate, (c) a terminal epoxide compound ('443). In each case it is also disclosed that the pvc component (a) can include the blending polymers recited in Kaufhold et al cited above.

None of the above disclosures mention a tendency to discolor caused by carbon monoxide modified ethylene-vinyl acetate copolymer.

Thus, while the well established and successful conventional heat stabilizers provide effective stabilization to the substrate polymer composition whose major polymeric component is pvc at elevated heat processing temperatures during standard processing, they may not provide effective stabilization to additives contained within the polymer during such heat processing. For example, the use of carbon monoxide modified ethylene-vinyl acetate copolymer in such compositions is not without limitations. It has been found that one important limitation is the tendency of an otherwise adequately stabilized pvc composition to discolor in the presence of carbon monoxide modified ethylene-vinyl acetate copolymer, with the intensity of discoloration increasing with increasing use levels of carbon monoxide modified ethylene-vinyl acetate copolymer in such composition.

It is therefore a general object of the present invention to provide a plastic composition containing a carbon monoxide modified ethylene copolymer with an unsaturated ester softening monomer, such as a carbon monoxide modified ethylene-vinyl acetate copolymer, having a diminished tendency to discolor at processing temperatures of the order of 180° C.

It is also an object of the invention to provide a carbon monoxide modified ethylene copolymer with an unsaturated ester softening monomer such as a carbon monoxide modified ethylene-vinyl acetate copolymer composition having a diminished tendency to discolor when incorporated in a plastic composition whose major polymeric component is pvc.

It is a further object of the invention to provide a method of stabilizing a plastic composition whose major polymeric component is pvc and which contains a carbon monoxide modified ethylene copolymer with an unsaturated ester softening monomer such as a carbon monoxide modified ethylene-vinyl acetate copolymer.

SUMMARY OF THE INVENTION

In accordance with this invention, there is provided a carbon monoxide modified ethylene copolymer with an unsaturated ester softening monomer composition and particularly a carbon monoxide modified ethylene-vinyl acetate copolymer composition having diminished tendency to cause discoloration on heating at 177° C. of a plastic composition whose major polymeric component is polyvinyl chloride, comprising a carbon monoxide modified ethylene copolymer with an unsaturated ester softening monomer, in particular a carbon monoxide modified ethylene-vinyl acetate copolymer, and an amount, effective in diminishing discoloration, of at least one inorganic perchlorate salt selected from the group consisting of alkali metal perchlorates and alkaline earth metal perchlorates. The effective amount of the perchlorate salt ranges from 0.03 parts by weight to 10 parts by weight per 100 parts by weight of carbon monoxide modified ethylene-vinyl acetate copolymer, calculated on a dry basis. A preferred amount of the perchlorate salt ranges from 0.1 part by weight to 5 parts by weight of carbon monoxide modified ethylene-vinyl acetate copolymer, calculated on a dry basis.

Also in accordance with this invention, there is provided a plastic composition having diminished tendency to discolor on heating at 177° C. in the presence of a carbon monoxide modified ethylene copolymer with an unsaturated ester softening monomer, in particular a carbon monoxide modified ethylene-vinyl acetate copolymer, comprising polyvinyl chloride, a carbon monoxide modified ethylene copolymer with an unsaturated ester softening monomer, particularly a carbon monoxide modified ethylene-vinyl acetate copolymer and an amount, effective in diminishing the tendency to discolor, of at least one inorganic perchlorate salt selected from the group consisting of alkali metal perchlorates and alkaline earth metal perchlorates. The amount of carbon monoxide modified ethylene copolymer is suitably a processing assisting amount in the range from 5 parts by weight to 50 parts by weight per 100 parts by weight of polyvinyl chloride. The amount of the perchlorate salt is in the range from 0.03 parts by weight to 10 parts by weight per 100 parts by weight of carbon monoxide modified ethylene copolymer.

Moreover, in accordance with this invention, there is provided a masterbatch composition adapted for safe storage, transport, and simplified compounding with a plastic composition whose major polymeric component is polyvinyl chloride, comprising a carbon monoxide modified ethylene copolymer with an unsaturated ester and at least one inorganic perchlorate salt selected from the group consisting of alkali metal perchlorates and alkaline earth metal perchlorates. The masterbatch according to the invention can contain from 7 parts by weight to 50 parts by weight of the perchlorate salt, calculated on a dry basis, per 100 parts by weight of carbon monoxide modified ethylene copolymer. The masterbatch according to the invention can additionally include water, calcium silicate, and inert inorganic diluent powder as required.

A masterbatch according to the invention simplifies the compounding of a carbon monoxide modified ethylene copolymer containing plastic composition whose major polymeric component is polyvinyl chloride with the effective amount of perchlorate salt required according to the invention by substituting for it a more proportionate quantity of a more easily handled and transported masterbatch as defined, along with additional carbon monoxide modified ethylene copolymer and other compounding ingredients as required.

Also provided in accordance with this invention is an insulated electrical conductor comprising a metallic conductor, a first insulating layer comprising flexible polyvinyl chloride surrounding the conductor, and a second layer surrounding the first insulating layer as a plenum or jacket. The second layer comprises polyvinyl chloride, a sufficient quantity of plasticizer to impart flexibility to the composition, a carbon monoxide modified ethylene copolymer with an unsaturated ester softening monomer, such as carbon monoxide modified ethylene-vinyl acetate copolymer, and an amount, effective in diminishing the tendency to discolor, of at least one inorganic perchlorate salt selected from the group consisting of alkali metal perchlorates and alkaline earth metal perchlorates. The amount of carbon monoxide modified ethylene copolymer is suitably a processing-assistant amount in the range from 5 parts by weight to 75 parts by weight per 100 parts by weight of polyvinyl chloride. The amount of the perchlorate salt is in the range from 0.03 parts by weight to 10 parts by weight per 100 parts by weight of carbon monoxide modified ethylene-vinyl acetate copolymer.

DETAILED DESCRIPTION OF THE INVENTION

Throughout this specification and the accompanying claims, the term polyvinyl chloride and its abbreviation pvc are used to refer to vinyl chloride polymers in general, including vinyl chloride homopolymer; copolymers of vinyl chloride as the major monomer with minor amounts of one or more unsaturated monomers such as vinyl acetate, vinylidene chloride, vinyl alkyl ethers, ethylene, propylene, dialkyl maleates and acrylonitrile; and blends of a vinyl chloride polymer with equal or lesser amounts of polymeric modifiers such as acrylic and methacrylic ester polymers, butadiene polymers, styrene polymers, acrylonitrile polymers, and copolymers of two or more of the here indicated monomers, chlorinated polyethylene and chlorinated vinyl chloride polymers. Additional representatives of the class of polymer materials to which the term polyvinyl chloride is here applied are disclosed by Wehner et al., U.S. Pat. No. 6,194,494 B1, at column 44 line 29 to column 45 line 16, which disclosure is here incorporated by reference.

The carbon monoxide modified ethylene-vinyl acetate copolymer used according to this invention is a representative of a class of carbon monoxide modified ethylene copolymers with unsaturated ester softening monomers which can be vinyl esters of saturated carboxylic acids having 1–18 carbon atoms and alkyl acrylates and methacrylates having 1 to 10 carbon atoms in the alkyl group. Typical vinyl ester softening monomers include vinyl acetate, vinyl propionate, vinyl 2-ethylhexoate and vinyl neodecanoate. Typical alkyl acrylate and methacrylate softening monomers include methyl acrylate, isobutyl acrylate, n-butyl acrylate, 2-ethylhexyl acrylate, ethyl methacrylate, isobutyl methacrylate, and isononyl methacrylate. Mixtures of softening monomers can be used.

Preferred copolymers used according to this invention are shown in the following Table:

| Ethylene, % by weight | CO, % by weight | Unsaturated ester, % by weight |
|---|---|---|
| 69 | 3 | vinyl acetate, 28 |
| 68.1 | 3 | methyl acrylate, 28 |
| 70.9 | 3.1 | isobutyl acrylate, 26 |

The alkali metal and alkaline earth metal perchlorates used according to this invention include barium perchlorate, calcium perchlorate, lithium perchlorate, magnesium perchlorate, potassium perchlorate, sodium perchlorate, and strontium perchlorate. Anhydrous solid forms, hydrated solid forms, and aqueous solutions of these perchlorate salts can be used according to the invention. Sodium perchlorate is preferred. Sodium perchlorate monohydrate is particularly preferred.

PVC used according to this invention can be rigid or flexible. Flexible PVC is preferred. Flexibility is imparted to PVC as known in the art by such techniques as limiting thickness of unmodified vinyl chloride homopolymer to 0.05 mm or less, by copolymerization of vinyl chloride with 10–20% of such comonomers as vinyl acetate (so-called internal plasticization), and particularly by compounding with compatible liquids known as plasticizers. Many suitable plasticizers are known in the art, including in particular the esters of dicarboxylic and tricarboxylic acids such as adipic, citric, phthalic and trimellitic acids with alcohols having 6–12 carbon atoms, preferably dialkyl phthalates and trialkyl trimellitates having 7 to 11 carbon atoms in the alkyl groups. Additional representatives of the class of suitable plasticizers are disclosed by Wehner et al., U.S. Pat. No. 6,194,494 B1, at column 37 line 36 to column 38 line 51, which disclosure is here incorporated by reference. Use levels of plasticizers when present can range from 5 parts by weight to 125 parts by weight per 100 parts of pvc.

PVC compositions according to this invention usually contain at least one heat stabilizer. Preference is usually given to environmentally acceptable heat stabilizers from which such toxic heavy metals as arsenic, cadmium, lead, and thallium are substantially excluded. Particularly preferred metal containing heat stabilizers are barium, calcium, magnesium, strontium, and zinc salts of aliphatic and aromatic non-nitrogenous monocarboxylic acids having 6 to 24 carbon atoms. Particularly preferred non-metallic heat stabilizers are aliphatic and aromatic phosphites, substituted phenols having a molecular weight of at least 200 daltons, ethers and esters having epoxide groups and molecular weight of at least 200 daltons and 1,3-dicarbonyl compounds having molecular weight of at least 200 daltons. Additional categories of suitable heat stabilizers are disclosed by Wehner et al., U.S. Pat. No. 6,194,494 B1, at column 1 line 4 to column 2 line 5, and many individual representatives of these categories are disclosed at column 2 line 46 to column 37 line 25 and column 39 line 8 to column 42 line 27. These disclosures are here incorporated by reference. Use levels of heat stabilizers when present can range from 0.01 to 10 parts by weight per 100 parts of pvc. Larger amounts can be used but are seldom required.

Conventional lubricants, flame retardants, colorants, fillers and other compounding ingredients and additives can be included in the composition of the invention as required. Among flame retardants there can be mentioned ammonium octamolybdate and other molybdate salts, antimony pentoxide, antimony trioxide, Group II metal stannates and hydroxystannates, and zinc borate. For a compilation of lubricants, flame retardants, colorants, fillers and other compounding ingredients and additives, reference can be had to Wehner et al., U.S. Pat. No. 6,194,494 B1, at column 37 lines 26–35, column 38 line 52 to column 39 line 7, which disclosure is here incorporated by reference.

The following examples are offered by way of illustration and not of limitation of the invention as defined by the appended claims.

EXAMPLES 1–7

The effectiveness of compositions of the invention was observed in a typical flexible PVC compound formulation with sodium perchlorate supplied in two different physical forms. All quantities are given in parts by weight.

| | |
|---|---|
| PVC resin | 100.0 |
| DIDP Diisodecyl phthalate plasticizer | 40.0 |
| Calcium carbonate | 15.0 |
| Epoxysoybean oil (stabilizer) | 5.0 |
| Titanium dioxide (white pigment) | 3.0 |
| Stearic acid | 0.2 |
| Ba/Zn solid stabilizer | 6.0 |
| carbon monoxide modified ethylene vinyl acetate copolymer (note) | 15.0 | note: DuPont Co. Elvaloy ® 741 brand copolymer

Various amounts of 60% Na perchlorate monohydrate aqueous solution (abbreviated NaP-60) or sodium perchlorate in form of a powder blend composition according to Bae et al., U.S. Pat. No. 5,034,443 containing 33% by weight NaP-60 solution (indicated as Powder Blend) were blended with this base formulation using a two roll mill, as shown below for each Example, and samples cut from each milled sheet were tested for static oven stability at two temperatures, 350° F. (177° C.) sampled at 15 minute intervals and 375° F. (190° C.) sampled at 10 minute intervals.

|  | EXAMPLE | | | | | | | |
| --- | --- | --- | --- | --- | --- | --- | --- | --- |
|  | A | 1 | 2 | 3 | 4 | 5 | 6 | 7 |
| NaP-60 parts actual | none | 0.3 | 0.5 | 1.0 | 1.5 | none | none | none |
| Powder Blend actual | none | none | none | none | none | 1.0 | 1.5 | 2.0 |
| As NaP-60 parts/100 copolymer | none | 2.0 | 3.33 | 6.67 | 10.0 | 2.2 | 3.3 | 4.4 |
| As NaClO$_4$ parts/100 copolymer | none | 0.96 | 1.6 | 3.2 | 4.8 | 1.06 | 1.59 | 2.13 |

The composition of Example A is a Control PVC compound without perchlorate. This composition initially discolored to brown at 177° C. and at 190° C. and turned to dark brown at 177° C. and at 190° C., but with perchlorate treated ketone modified ethylene-vinyl acetate copolymer as in Examples 1–7 according to the invention the test compound color change was much less.

In the 177° C. oven test, the color change of Examples 1–7 is minimal (no sign of brown color in 120 minutes) and at 190° C. the Examples 1–7 compounds containing the perchlorate and carbon monoxide modified ethylene-vinyl acetate copolymer shows improved long term stability compared to Control A.

EXAMPLES 8–11

The effectiveness of the composition of the invention was observed in a flame retardant plenum base formulation with varied levels of sodium perchlorate monohydrate and varied levels of ketone modified ethylene-vinyl acetate copolymer.

| | |
| --- | --- |
| PVC resin | 100 |
| DIDP-E dialkyl phthalate plasticizer | 50 |
| Omya F brand of calcium carbonate | 15 |
| Antimony trioxide flame retardant | 5 |
| Stearic acid | 0.3 |
| carbon monoxide modified ethylene-vinyl acetate copolymer | variable |
| Powder blend containing NaClO$_4$ | variable |

The amounts of carbon monoxide modified ethylene-vinyl acetate copolymer and Powder Blend containing NaP-60 sodium perchlorate monohydrate solution blended with each Example formulation and tested for static oven heat stability at 350° F. (177° C.) and 400° F. (205° C.) are shown below:

|  | EXAMPLE | | | | | | | |
| --- | --- | --- | --- | --- | --- | --- | --- | --- |
|  | B | C | D | E | 8 | 9 | 10 | 11 |
| Copolymer, parts | none | 10 | 20 | 30 | 10 | 20 | 30 | 30 |
| Powder blend actual | none | none | none | none | 1.0 | 1.0 | 1.0 | 0.5 |
| As NaP-60 parts solution | none | none | none | none | 0.33 | 0.33 | 0.33 | 0.167 |
| As NaP-60/100 copolymer | n/a | none | none | none | 3.3 | 1.65 | 1.1 | 0.55 |
| As dry NaClO$_4$/100 copolymer | n/a | none | none | none | 1.6 | 0.8 | 0.53 | 0.26 |

The composition of Example B is a Control PVC compound without carbon monoxide modified ethylene-vinyl acetate copolymer and without perchlorate. The compositions of Examples C, D, and E are Control PVC compounds containing ketone modified ethylene-vinyl acetate copolymer without perchlorate. The compositions of Control Examples B, C, D, and E do not contain any stabilizer.

The compositions of Examples 8–11 are examples according to the invention, stabilized only with the powder blend containing sodium perchlorate monohydrate.

Each of the Control compositions showed substantial discoloration as early as 15 minutes at 177° C. and 5 minutes at 205° C. In contrast, the perchlorate stabilized compositions of Examples 8–11 delayed discoloration for much of the test period, and were less discolored at 177° C. in 60 minutes than the Control compositions at 15 minutes at 177° C., and were less discolored at 205° C. in 15 minutes than the Control compositions in 5 minutes at 205° C.

Addition of perchlorate substantially prevented brown discoloration of Example 6 to 105 minutes at 177° C., and for the entire 120 minute test period at that temperature in Examples 7–12. In the test at 205° C. as little as 0.083 parts of the sodium perchlorate monohydrate solution (contained in 0.25 parts of the powder blend used in Example 6) was effective in delaying brown discoloration, and increasing perchlorate levels were particularly effective.

EXAMPLES 12–16

The effectiveness of the composition of the invention was observed in the plenum base formulation of Examples 8–11 with a barium-zinc carboxylate heat stabilizer added.

| | |
| --- | --- |
| PVC resin | 100 |
| DIDP-E dialkyl phthalate plasticizer | 50 |
| Omya F brand of calcium carbonate | 15 |
| Barium-zinc solid stabilizer | 6 |
| Antimony trioxide flame retardant | 5 |
| Stearic acid | 0.3 |
| carbon monoxide modified ethylene-vinyl acetate copolymer | variable |
| Powder blend containing NaClO$_4$ | variable |

The amounts of carbon monoxide modified ethylene-vinyl acetate copolymer and Powder Blend containing NaP-60 sodium perchlorate monohydrate solution blended with each Example formulation and tested for static oven heat stability at 350° F. (177° C.) and 400° F. (205° C.) are shown below:

|  | EXAMPLE | | | | | | | |
| --- | --- | --- | --- | --- | --- | --- | --- | --- |
|  | F | G | H | 12 | 13 | 14 | 15 | 16 |
| Copolymer, parts | none | 15 | 30 | 15 | 15 | 30 | 30 | 30 |
| Powder blend actual | none | none | none | 0.5 | 1.0 | 0.5 | 1.0 | 2.0 |
| As NaP-60 parts solution | none | none | none | 0.167 | 0.33 | 0.167 | 0.33 | 0.67 |
| As NaP-60/100 copolymer | n/a | none | none | 1.11 | 2.23 | 0.55 | 1.11 | 2.23 |
| As dry NaClO$_4$/100 copolymer | n/a | none | none | 0.53 | 1.06 | 0.26 | 0.53 | 1.06 |

The composition of Example F is a Control PVC compound without carbon monoxide modified ethylene-vinyl acetate copolymer and without perchlorate. This composition showed the typical behavior of a barium-zinc stabilized composition, with slight yellowing noticeable at 45 minutes in the test at 177° C. and at 10 minutes in the test at 205° C. The composition also showed a noticeable brown discoloration in 35 minutes at 205° C. No such brown discoloration occurred at 177° C. up to the end of the test at 120 minutes. The compositions of Examples G and H are Control PVC compounds containing carbon monoxide modified ethylene-vinyl acetate copolymer without perchlorate, and showed progressively earlier and more intense discoloration with increasing copolymer use level. Thus, the compositions of Examples G and H reached in 30 minutes at 177° C. and 5 minutes at 205° C. the slight yellow discoloration by the composition of Example F in 45 minutes at 177° C. and in 10 minutes at 205° C. The compositions of Examples G and H also reached in 90 minutes at 177° C. and in 30 minutes at 205° C. a more intense brown discoloration than the composition of Example F reached in 35 minutes at 205° C.

This illustrates the aggravated heat stability problem associated with the inclusion of the carbon monoxide modified ethylene-vinyl acetate copolymer in the vinyl chloride polymer composition.

In contrast, the compositions of Examples 12–16 according to the invention showed less yellowing than the compositions of Control Examples G and H in 30 minutes at 177° C. and 5 minutes at 205° C. and did not show the brown discoloration seen with Examples G and H before the 120 minutes end of the test at 177° C. or the 40 minutes end of the test at 205° C.

Thus the stability problem with carbon monoxide modified ethylene-vinyl acetate copolymer in pvc is counteracted and even reversed by the addition of sodium perchlorate in accordance with the invention.

What is claimed is:

1. A composition consisting of a carbon monoxide modified copolymer of ethylene an unsaturated ester softening monomer and from 0.03 part by weight to 10 parts by weight per 100 parts by weight of said carbon monoxide modified ethylene copolymer of at least one inorganic perchlorate salt selected from the group consisting of alkali metal perchlorates and alkaline earth metal perchlorates.

2. The composition of claim 1, wherein said carbon monoxide modified ethylene copolymer is a carbon monoxide modified ethylene-vinyl acetate copolymer.

3. The composition of claim 1, wherein said inorganic perchlorate is sodium perchlorate.

4. The composition of claim 3, wherein said perchlorate is sodium perchlorate monohydrate.

5. A plastic composition consisting of polyvinyl chloride, a carbon monoxide modified copolymer of ethylene an unsaturated ester softening monomer, at least one inorganic perchlorate salt selected from the group consisting of alkali metal perchlorates and alkaline earth metal perchlorates, and, optionally,
   A) at least one plasticizer;
   B) at least one heat stabilizer selected from the group consisting of:
      1) barium, calcium, magnesium, strontium, and zinc salts of aliphatic or aromatic non-nitrogenous monocarboxylic acids having from 6 to 24 carbon atoms;
      2) ethers and esters having epoxide groups and molecular weights of at least 200 daltons; and
      3) 1,3-dicarbonyl compounds having molecular weights of at least 200 daltons;
   C) lubricants;
   D) flame retardants;
   E) colorants; and
   F) fillers.

6. The composition of claim 5, wherein said carbon monoxide modified ethylene copolymer is a carbon monoxide modified ethylene-vinyl acetate copolymer.

7. The composition of claim 6, wherein the amount of carbon monoxide modified ethylene-vinyl acetate copolymer is in the range from 5 parts by weight to 75 parts by weight per 100 parts by weight of polyvinyl chloride.

8. The composition of claim 6, wherein the amount of said perchlorate is in the range from 0.03 parts by weight to 10 parts by weight per 100 parts by weight of carbon monoxide modified ethylene-vinyl acetate copolymer.

9. The composition of claim 6, wherein said inorganic perchlorate is sodium perchlorate.

10. The composition of claim 6, wherein said at least one plasticizer is present and is selected from the group consisting of dialkyl phthalates and trialkyl trimellitates having independently in each alkyl group seven to eleven carbon atoms.

11. The composition of claim 6, wherein said at least one heat stabilizer is present and is selected from the group consisting of barium, calcium, magnesium, strontium and zinc salts of a monocarboxylic acid having 7–24 carbon atoms.

12. The composition of claim 6, wherein said at least one heat stabilizer is present and is an epoxide compound.

13. A masterbatch composition adapted for safe storage, transport, and compounding with a plastic composition whose major polymeric component is polyvinyl chloride, consisting of carbon monoxide modified ethylene-vinyl acetate copolymer and at least one inorganic perchlorate salt selected from the group consisting of alkali metal perchlorates and alkaline earth metal perchlorates, said masterbatch containing from 7 parts by weight to 50 parts by weight of said perchlorate salt per 100 parts by weight of carbon monoxide modified ethylene-vinyl acetate copolymer and, optionally, A) at least one plasticizer;
B) at least one heat stabilizer selected from the group consisting of:
1) barium, calcium, magnesium, strontium, and zinc salts of aliphatic or aromatic non-nitrogenous monocarboxylic acids having from 6 to 24 carbon atoms;
2) ethers and esters having epoxide groups and molecular weights of at least 200 daltons; and
3) 1,3-dicarbonyl compounds having molecular weights of at least 200 daltons;
C) lubricants;
D) flame retardants
E) colorants; and
F) fillers.

14. The masterbatch composition of claim 13, containing from 10 parts by weight to 30 parts by weight of said perchlorate salt per 100 parts by weight of carbon monoxide modified ethylene-vinyl acetate copolymer.

15. The masterbatch composition of claim 13, wherein said perchlorate is sodium perchlorate.

16. The masterbatch composition of claim 15, wherein said perchlorate is sodium perchlorate monohydrate.

17. A method of reducing discoloration on heating at 180° C. of a plastic composition consisting of 100 parts by weight of polyvinyl chloride, from 5 parts by weight to 75 parts by weight of a carbon monoxide modified ethylene-vinyl acetate copolymer, and, optionally, A) at least one plasticizer;
B) at least one heat stabilizer selected from the group consisting of:
1) barium, calcium, magnesium, strontium and zinc salts of aliphatic or aromatic non-nitrogenous monocarboxylic acids having from 6 to 24 carbon atoms;
2) ethers and esters having epoxide groups and molecular weights of at least 200 daltons; and
3) 1,3-dicarbonyl compounds having molecular weights of at least 200 daltons;
C) lubricants;
D) flame retardants;
E) colorants; and
D) fillers;

comprising the step of adding to said composition from 0.03 parts by weight to 10 parts by weight of at least one inorganic perchlorate salt selected from the group consisting of alkali metal perchlorates and alkaline earth metal perchlorates per 100 parts by weight of the carbon monoxide modified ethylene-vinyl acetate copolymer.

* * * * *